US012673600B2

(12) United States Patent
Honda et al.

(10) Patent No.: US 12,673,600 B2
(45) Date of Patent: Jul. 7, 2026

(54) HAND REST DEVICE AND VEHICLE OCCUPANT SUPPORT DEVICE

(71) Applicant: NHK SPRING CO., LTD., Yokohama (JP)

(72) Inventors: Chikanori Honda, Yokohama (JP); Kousuke Suzuki, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 176 days.

(21) Appl. No.: 18/483,431

(22) Filed: Oct. 9, 2023

(65) Prior Publication Data

US 2024/0123886 A1 Apr. 18, 2024

(30) Foreign Application Priority Data

Oct. 12, 2022 (JP) ................................. 2022-164238

(51) Int. Cl.
*B60N 3/00* (2006.01)
*B60N 2/75* (2018.01)

(52) U.S. Cl.
CPC ............... *B60N 3/004* (2013.01); *B60N 2/75* (2018.02)

(58) Field of Classification Search
CPC ... B60N 2/77; B60N 2/78; B60N 2/75; B60N 3/004
USPC ........................... 297/188.18, 188.14, 188.17
See application file for complete search history.

(56) References Cited

U.S. PATENT DOCUMENTS

| | | | | |
|---|---|---|---|---|
| 3,985,374 A | * | 10/1976 | Powaska ................ | B60N 3/004 |
| | | | | 248/240.4 |
| 5,359,349 A | | 10/1994 | Jambor et al. | |
| 9,828,101 B2 | * | 11/2017 | Shih ................... | B64D 11/0644 |
| 2009/0302648 A1 | * | 12/2009 | Kato ................... | B60N 2/0024 |
| | | | | 297/217.2 |

FOREIGN PATENT DOCUMENTS

| | | |
|---|---|---|
| JP | H04-212648 A | 8/1992 |
| JP | 5984660 B2 | 9/2016 |
| JP | 2018-167694 A | 11/2018 |

OTHER PUBLICATIONS

Suzuki et al., "Hand Support Reduces Carsickness and Neck Fatigue Caused by Smartphone Use in a Car"; Proceedings of 2022 JSAE Annual Congress (Autumn), pp. 1-6, Oct. 7, 2022.
Office Action issued in Japanese Application No. 2022-164238, dated Feb. 3, 2026.

* cited by examiner

*Primary Examiner* — Milton Nelson, Jr.
(74) *Attorney, Agent, or Firm* — Knobbe, Martens, Olson & Bear, LLP

(57) ABSTRACT

A hand rest device, including: a hand rest that is disposed at a front side of a seat of a vehicle, the hand rest being disposed at a usage position for supporting a hand of a vehicle occupant seated at the seat and an adjustment mechanism that adjusts a height of the usage position of the hand rest.

4 Claims, 15 Drawing Sheets

| RATING | FEELING |
|---|---|
| 0 | NO SYMPTOMS |
| 1 | SLIGHT SYMPTOMS |
| 2 | MILD SYMPTOMS BUT NO NAUSEA |
| 3 | MILD NAUSEA |
| 4 | MILD TO MODERATE NAUSEA |
| 5 | MODERATE NAUSEA BUT CAPABLE OF CONTINUING TRAVEL |
| 6 | MODERATE NAUSEA AND WANTING TO STOP TRAVEL |

LEVELS OF MOTION SICKNESS

FIG.13B

| RATING | DEFINITION |
|---|---|
| 3 | VERY EASY TO VIEW |
| 2 | EASY TO VIEW |
| 1 | FAIRLY EASY TO VIEW |
| 0 | NEUTRAL |
| -1 | FAIRLY HARD TO VIEW |
| -2 | HARD TO VIEW |
| -3 | VERY HARD TO VIEW |

EASE OF VIEWING OF A SCREEN

FIG.13C

| RATING | DEFINITION |
|---|---|
| 6 | EXTREMELY FATIGUED |
| 5 | VERY FATIGUED |
| 4 | FATIGUED |
| 3 | MODERATELY FATIGUED |
| 2 | A LITTLE FATIGUED |
| 1 | SLIGHTLY FATIGUED |
| 0 | NOT FATIGUED |

FATIGUE

FIG.14

| NUMBER OF PEOPLE | HEIGHT AT WHICH THAT MANY PEOPLE CAN SEE FORWARD IN A FIELD OF VIEW AROUND THE HAND | HEIGHT AT WHICH THAT MANY PEOPLE DO NOT EXPERIENCE NUMBNESS IN THE ARM |
|---|---|---|
| 1 | 250 | 570 |
| 2 | 280 | 540 |
| 3 | 290 | 530 |
| 4 | 310 | 520 |
| 5 | 320 | 500 |
| 6 | 330 | 490 |
| 7 | 360 | 480 |
| 8 | 370 | 450 |
| 9 | 390 | 420 |
| | [mm] | [mm] |

HAND REST DEVICE AND VEHICLE OCCUPANT SUPPORT DEVICE

CROSS-REFERENCE TO RELATED APPLICATION

This application is based on and claims priority under 35 USC 119 from Japanese Patent Application No. 2022-164238, filed on Oct. 12, 2022, the entire disclosure of which is incorporated by reference herein.

BACKGROUND

Technical Field

The present disclosure relates to a hand rest device at which a hand rest supports a hand of a vehicle occupant and to a vehicle occupant support device that is equipped with the hand rest device.

Related Art

A display workstation recited in Japanese Patent Application Laid-Open (JP-A) No. H4-212648 is disposed at a front side of a seat (at a rear side of a front seat), and a hand rest is provided at the display workstation.

This display workstation, together with the hand rest, may be stowed from a usage position into a stowing recess portion of the front seat.

SUMMARY

The present disclosure provides a hand rest and a vehicle occupant support device at which a height of a usage position of the hand rest may be set appropriately.

A hand rest device according to a first aspect of the present disclosure includes: a hand rest that is disposed at a front side of a seat of a vehicle, the hand rest being disposed at a usage position for supporting a hand of a vehicle occupant seated at the seat; and an adjustment mechanism that adjusts a height of the usage position of the hand rest.

In the hand rest device according to the first aspect of the present disclosure, the hand rest is disposed at the front side of the vehicle seat. The hand rest is disposed at the usage position and supports a hand of a vehicle occupant sitting at the seat.

The adjustment mechanism adjusts the height of the usage position of the hand rest. Therefore, the height of the usage position of the hand rest may be set appropriately.

In a hand rest device according to a second aspect of the present disclosure, in the hand rest device according to the first aspect of the present disclosure, the adjustment mechanism adjusts the usage position of the hand rest to a height in a height range from a lower end of a sternum to an upper end of a shoulder of the vehicle occupant.

In the hand rest device according to the second aspect of the present disclosure, the adjustment mechanism adjusts the usage position of the hand rest to a height in the height range from the lower end of the sternum of the vehicle occupant to the upper end of the shoulder. Therefore, the hand rest may support the hand of the vehicle occupant at high positions.

In a hand rest device according to a third aspect of the present disclosure, in the hand rest device according to the first aspect or second aspect of the present disclosure, the adjustment mechanism adjusts the usage position of the hand rest to a height in a height range from greater than or equal to 320 ram to less than or equal to 500 mm from a hip point of the vehicle occupant.

In the hand rest device according to the third aspect of the present disclosure, the adjustment mechanism adjusts the usage position of the hand rest to a height in the height range from greater than or equal to 320 turn to less than or equal to 500 mm from the hip point of the vehicle occupant. Therefore, the hand rest may support the hand of the vehicle occupant at high positions.

In a hand rest device according to a fourth aspect of the present disclosure, in the hand rest device according to any one of the first to third aspects of the present disclosure, the vehicle occupant has a physique corresponding to JM50.

In the hand rest device according to the fourth aspect of the present disclosure, the vehicle occupant has a physique corresponding to IWO. Therefore, usage positions of the hand rest may be set suitably for adults.

A vehicle occupant support device according to a fifth aspect of the present disclosure includes: the hand rest device according to any one of the first to fourth aspects of the present disclosure; and an arm rest disposed at a left side or a right side of the seat, a protrusion portion being provided at the arm rest, and the protrusion portion protruding to a left-right direction inner side of the seat to support an arm of the vehicle occupant.

In the vehicle occupant support device according to the fifth aspect of the present disclosure, the arm rest is disposed at the left side or the right side of the seat, and the projecting portion of the arm rest projects to the left-right direction inner side of the seat and supports an arm of a vehicle occupant. Therefore, the arm of the vehicle occupant may be supported when the vehicle occupant is moving their hand to the middle side in the left-right direction of the vehicle occupant.

As described above, at a hand rest device and a vehicle occupant support device according to the present disclosure; the height of a usage position of the hand rest may be set appropriately.

BRIEF DESCRIPTION OF THE DRAWINGS

An exemplary embodiment of the present disclosure will be described in detail based on the following FIGS. wherein:

FIG. 2 is a perspective view, seen from the front-left, showing the vehicle seat apparatus in FIG. 1;

FIG. 13A is a table showing ratings of motion sickness sensation for FIG. 8;

FIG. 13B is a table showing ratings of ease of viewing of a smartphone screen for FIG. 9;

FIG. 13C is a table showing ratings of fatigue for FIG. 10, FIG. 11 and FIG. 12;

FIG. 14 is a table showing numbers of people with heights of the hand rest according to the vehicle seat apparatus in FIG. 1 at which that many people can see forward in a field of view around their hand, and heights of the hand rest at which that many people do not experience numbness in their arms.

DETAILED DESCRIPTION

Figure 1:
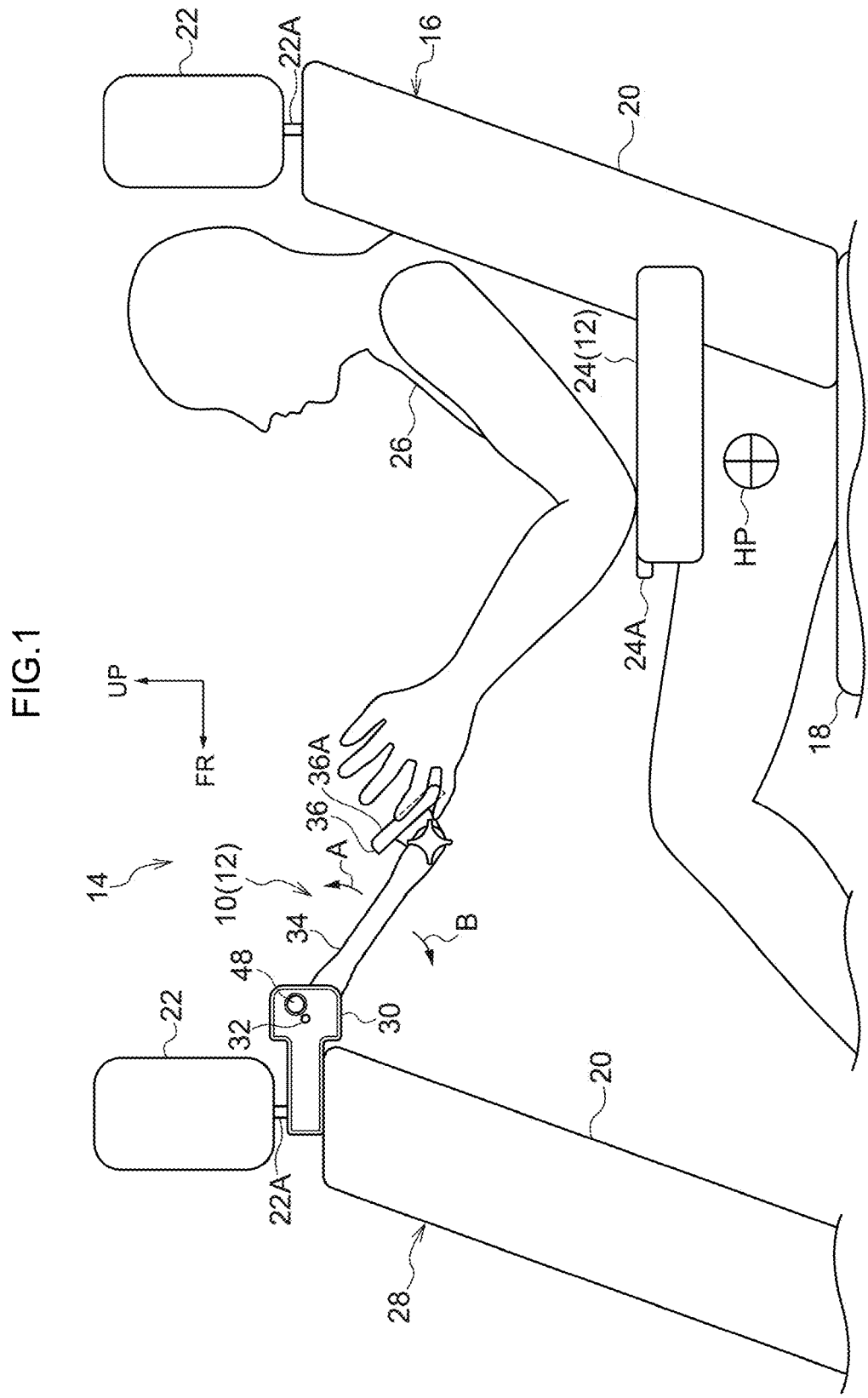
FIG. 1 is a side view, seen from the left, showing a vehicle seat apparatus according to an exemplary embodiment of the present disclosure.
Figure 2:
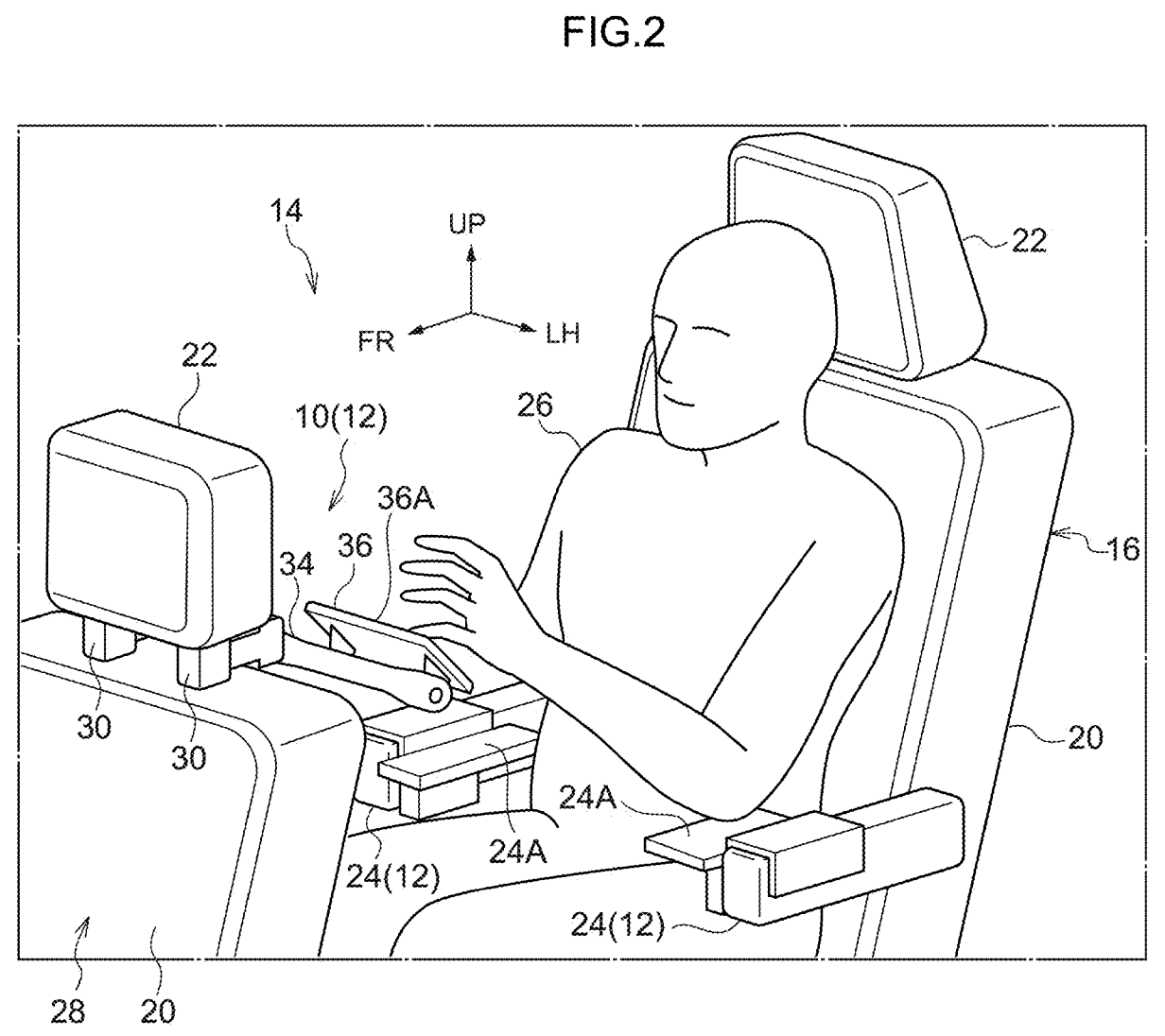

FIG. 1 shows a side view in which a vehicle seat apparatus 14 is viewed from the left. A vehicle occupant support device 12 (including a hand rest device 10) according to an exemplary embodiment of the present disclosure is employed at the vehicle seat apparatus 14. FIG. 2 shows a perspective view viewing the vehicle seat apparatus 14 from the front-left. In the drawings, forward of the vehicle seat apparatus 14 is indicated by arrow FR, leftward of the vehicle seat apparatus 14 is indicated by arrow LH, and upward of the vehicle seat apparatus 14 is indicated by arrow UP.

The vehicle seat apparatus 14 according to the present exemplary embodiment is provided in a cabin of a vehicle (a car). The front, left and upper side of the vehicle seat apparatus 14 are oriented to, respectively, the front, left and upper side of the vehicle.

As shown in FIG. 1 and FIG. 2, a seat 16 is provided at the vehicle seat apparatus 14. A seat cushion 18 is provided at a lower portion of the seat 16, and a seat back 20 is provided at the upper side of a rear end portion of the seat cushion 18. A tilting position of the seat back 20 relative to the seat cushion 18 is adjustable in the front-and-rear direction. The seat back 20 is tilted by, for example, 23° to the rear side relative to the seat cushion 18 A head rest 22 is provided at the upper side of the seat back 20. A pair of rod-shaped stays 22A are fixed at a lower end of the head rest 22. The stays 22A project to the lower side and are fixed to an upper end portion of the head rest 22. Thus, the head rest 22 is supported at the seat back 20.

Arm rests 24 in long, narrow, substantially cuboid shapes are provided at the left side and right side of a lower portion of the seat back 20. The arm rests 24 structure the vehicle occupant support device 12, Each arm rest 24 projects forward. At a front portion of each arm rest 24, a protruding plate 24A in a rectangular plate shape is provided to serve as a protrusion portion. The protruding plate 24A protrudes to an inner side of the seat 16 in the left-right direction and is disposed to the upper side of the seat cushion 18. The protruding plate 24A protrudes further to the front side than the arm rest 24. A position of the protruding plate 24A relative to the arm rest 24 may be adjustable, and the protruding plate 24A may be made attachable to and detachable from the arm rest 24.

When a vehicle occupant 26 is seated at the seat 16, the seat cushion 18 supports the buttock area and thigh area of the vehicle occupant 26, the seat back 20 supports the back area of the vehicle occupant 26, the head rest 22 supports the head area of the vehicle occupant 26, and the arm rests 24 (including the protruding plates 24A) support the arms (including the elbows) of the vehicle occupant 26.

A front seat 28 that serves as an attachment object is provided to the front side of the seat 16. Similarly to the seat 16, the seat cushion 18, the seat back 20 and the head rest 22 (including the stays 22A) are provided at the front seat 28.

The hand rest device 10 (see FIG. 3), which structures the vehicle occupant support device 12, is provided at the front seat 28.

A pair of attachment bodies 30 in long, narrow, substantially cuboid shapes are provided at the hand rest device 10. Front portions of the attachment bodies 30 are attached to the stays 22A of the head rest 22 of the front seat 28. Thus, the hand rest device 10 is attached to the front seat 28 and is disposed to the front side of the seat 16. Each attachment body 30 projects to the rear. A central shaft 32 in a circular rod shape is turnably fixed to a rear portion of the attachment body 30. A proximal end portion of a turning shaft 34 in a substantially circular rod shape is supported at the central shaft 32. The turning shaft 34 is turnable in one direction A and another direction B around the central shaft 32.

A hand rest 36 in a substantially rectangular board shape (a hand pedestal or table) is turnably supported at distal end portions of the pair of turning shafts 34. A rotary position of the hand rest 36 relative to the turning shafts 34 is adjustable. A rear side face of the hand rest 36 serves as a support surface 36A with a rectangular flat surface shape.

An adjustment mechanism 38 (see FIG. 5A and FIG. 5B) is provided between a rear portion of the attachment body 30 and the proximal end portion of the turning shaft 34 at the left side.

A casing 40 in a substantially cuboid box shape is provided at the adjustment mechanism 38. The casing 40 is fixed to the proximal end portion of the turning shaft 34. The central shaft 32 penetrates through the casing 40, and the casing 40 is turnable around the central shaft 32 integrally with the turning shaft 34. A restraining protrusion 40A in a substantially triangular column shape, which serves as a restrained portion, is provided integrally inside the casing 40.

Figure 4A:
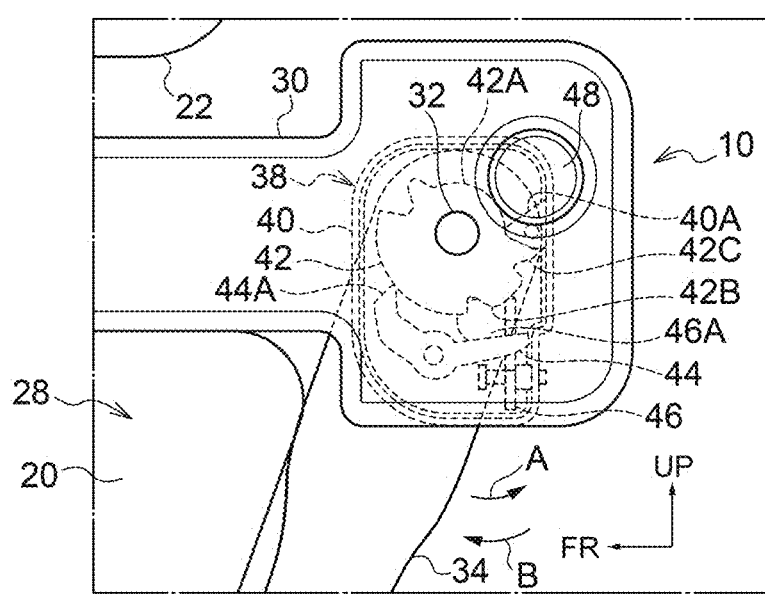
FIG. 4A is a side view, seen from the left, showing an adjustment mechanism of the hand rest device in FIG. 3 when a hand rest is being disposed at a storage position.
Figure 4B:
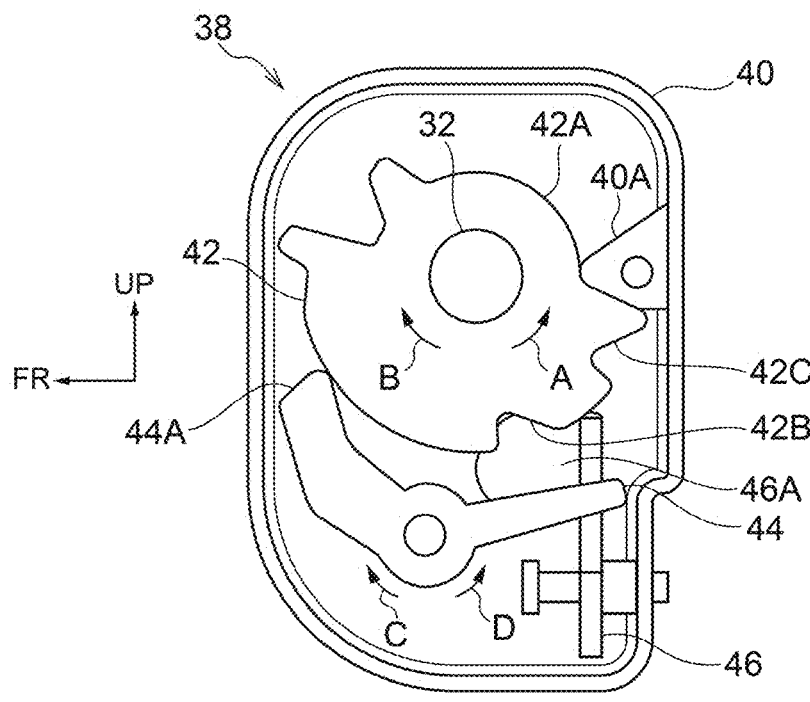
FIG. 4B is a side view, seen from the left, showing principal portions of the adjustment mechanism.
Figure 6A:
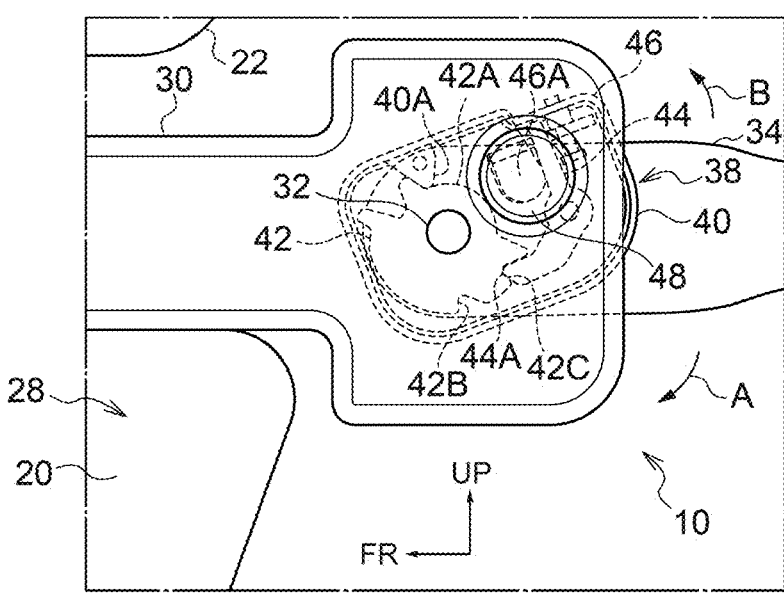
FIG. 6A is a side view, seen from the left, showing the adjustment mechanism of the hand rest device in FIG. 3 when the hand rest is being disposed at a second usage position.

A gearwheel 42 in a substantially circular plate shape, which serves as a lock member, is provided inside the casing 40. The central shaft 32 penetrates through the gearwheel 42. The gearwheel 42 is fixed to the central shaft 32 and is non-turnable. A restraining slot 42A that serves as a restraining portion is formed at an outer periphery portion of the gearwheel 42. The restraining slot 42A extends in the circumferential direction of the central shaft 32. The restraining protrusion 40A of the casing 40 can be inserted into the restraining slot 42A. The restraining protrusion 40A of the casing 40 abuts against one end face of the restraining slot 42A to restrain turning of the casing 40 and the turning shaft 34 in the one direction A (see FIG. 6A), and the restraining protrusion 40A abuts against another end face of the restraining slot 42A to restrain turning of the casing 40 and the turning shaft 34 in the other direction B (see FIG. 4A and FIG. 4B). A first slot 42B and a second slot 42C with triangular shapes in cross section, which serve as locking portions, are formed at the outer periphery portion of the gearwheel 42. The second slot 42C is disposed at the side in the one direction A relative to the first slot 42B.

A lock plate 44 in an "L"-shaped plate shape, which serves as a locked member, is provided inside the casing 40. A central portion of the lock plate 44 is supported at the interior of the casing 40. The lock plate 44 is turnable around the central portion in a locking direction C and an unlocking direction D. The lock plate 44 is urged in the locking direction C, A pawl portion 44A in a triangular plate shape, which serves as a locked portion, is formed at one end portion of the lock plate 44. The pawl portion 44A is meshed by the urging force of the lock plate 44 with the first slot 42B of the gearwheel 42. As a result, turning of the pawl portion 44A in the another direction B is locked by the first slot 42B. Therefore, turning of the casing 40 and the turning shaft 34 in the another direction B is restrained, and the hand rest 36 is disposed at a first usage position.

When the casing 40 and the turning shaft 34 are turned in the one direction A, the pawl portion 44A is removed from the first slot 42B and the lock plate 44 is turned in the unlocking direction D in opposition to the urging force. Then, the lock plate 44 is turned in the locking direction C by the urging force and the pawl portion 44A is meshed with the second slot 42C of the gearwheel 42. As a result, turning of the pawl portion 44A in the another direction B is locked by the second slot 42C. Therefore, turning of the casing 40 and the turning shaft 34 in the another direction B is restrained, and the hand rest 36 is disposed at a second usage position (see FIG. 6A). When the hand rest 36 is disposed al the second usage position, the restraining protrusion 40A of the casing 40 abuts against the one end face of the restraining slot 42A of the gearwheel 42 as mentioned above, restraining turning of the casing 40 and the turning shaft 34 in the one direction A. Therefore, turning of the hand rest 36 in the one direction A from the second usage position is restrained.

When the hand rest 36 is disposed at the first usage position or the second usage position, the support surface 36A of the hand rest 36 supports a hand of the vehicle occupant 26.

A release plate 46 in a substantially "L"-shaped plate shape, which serves as a releasing member, is provided inside the casing 40. A central portion of the release plate 46 is supported at the interior of the casing 40. The release plate 46 is turnable around the central portion, and is urged to one turning direction side. Another end portion of the lock plate 44 is disposed between one side portion and another side portion of the release plate 46. The one side portion of the release plate 46 is urged against the another end portion of the lock plate 44 by the urging force of the release plate 46. An operation piece 46A is integrally provided at the one side portion of the release plate 46. The operation piece 46A protrudes from the release plate 46.

A button 48 in a circular rod shape, which serves as an operation member, is provided at a rear portion of the attachment body 30. An axial direction of the button 48 is in the left-right direction. The button 48 is movable in a predetermined range in the left-right direction, and is urged to the left. A left end portion of the button 48 broadens coaxially. The left end portion of the button 48 is exposed at the left side of the attachment body 30 and is operable by pushing to the right in opposition to the urging force thereof. The button 48 can enter into the casing 40, disposing the button 48 at the right side of the operation piece 46A of the release plate 46.

Figure 6B:
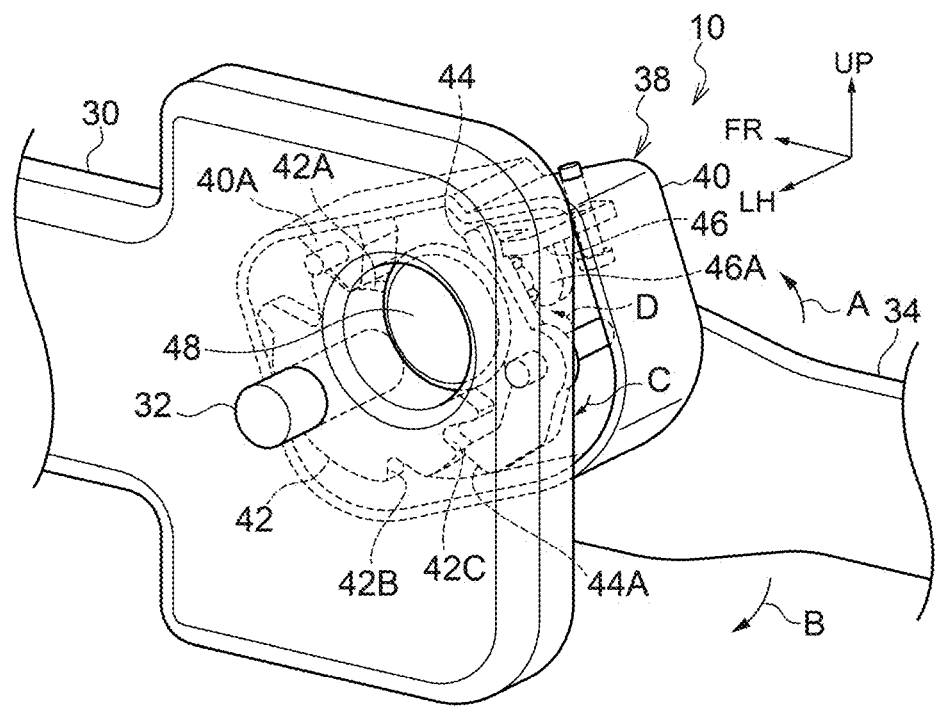
FIG. 6B is a perspective view, seen from the rear-left, showing the adjustment mechanism of the hand rest device in FIG. 3 when a turning restraint of the hand rest is being released.

When the button 48 is operated by pressing of the left end portion to the right in opposition to the urging force thereof, the operation piece 46A of the release plate 46 is pressed to the right side by the button 48, and the release plate 46 turns in opposition to the urging force thereof. As a result, the other end portion of the lock plate 44 is pushed by the other side portion of the release plate 46, and the lock plate 44 turns in the unlocking direction D (see FIG. 6B) in opposition to the urging force thereof. Thus, the pawl portion 44A of the lock plate 44 is disabled from meshing with the first slot 42B and the second slot 42C of the gearwheel 42, Hence, in the state in which the button 48 has been operated by pressing to the right, the casing 40 and the turning shaft 34 are turned in the another direction B and the hand rest 36 is disposed to a storage position (see FIG. 4A and FIG. 4B). When the hand rest 36 is disposed at the storage position, the restraining protrusion 40A of the casing 40 is abutted against the other end face of the restraining slot 42A of the gearwheel 42 as mentioned above, restraining turning of the casing 40 and the turning shaft 34 in the another direction B. Therefore, turning of the hand rest 36 in the another direction B from the storage position is restrained.

Figure 5A:
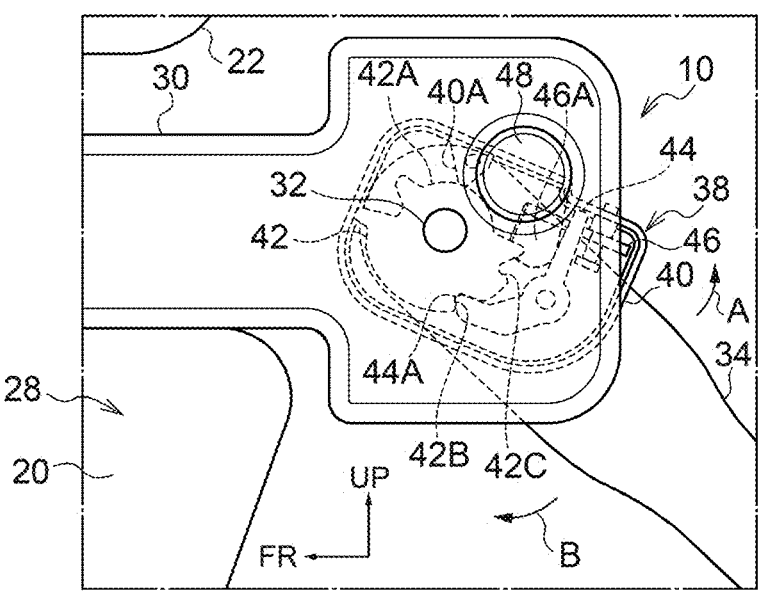
FIG. 5A is a side view, seen from the left, showing the adjustment mechanism of the hand rest device in FIG. 3 when the hand rest is being disposed at a first usage position.
Figure 5B:
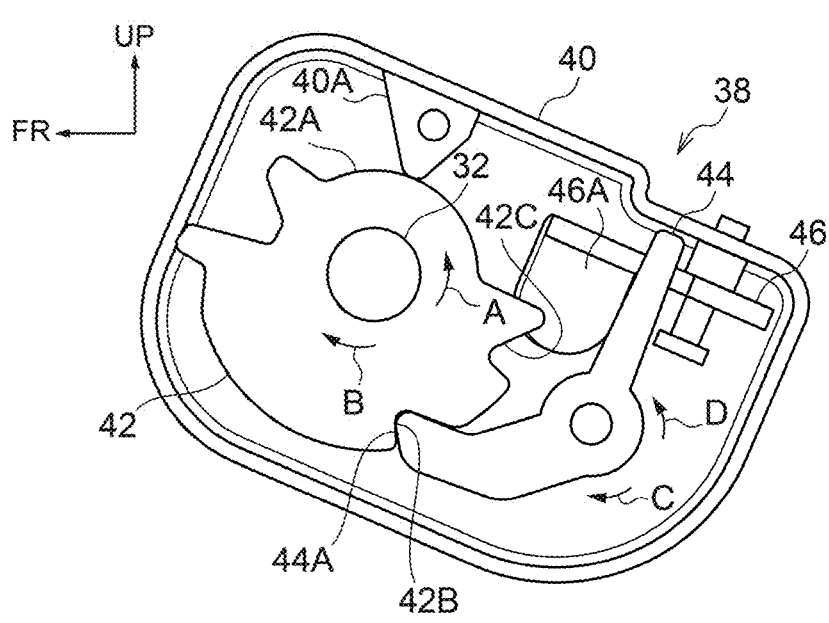
FIG. 5B is a side view, seen from the left, showing the principal portions of the adjustment mechanism.

When the casing 40 and the turning shaft 34 are turned in the one direction A from the state in which the hand rest 36 is disposed at the storage position, without the button 48 being operated by pressing to the right, the lock plate 44 is turned in the locking direction C by the urging force thereof and the pawl portion 44A of the lock plate 44 is meshed with the first slot 42B of the gearwheel 42, and the hand rest 36 is disposed at the first usage position (see FIG. 5A and FIG. 5B). Between the storage position and the first usage position of the hand rest 36, the pawl portion 44A of the lock plate 44 is incapable of meshing with the gearwheel 42, and turning of the casing 40 and the turning shaft 34 is not restrained.

Figure 3:
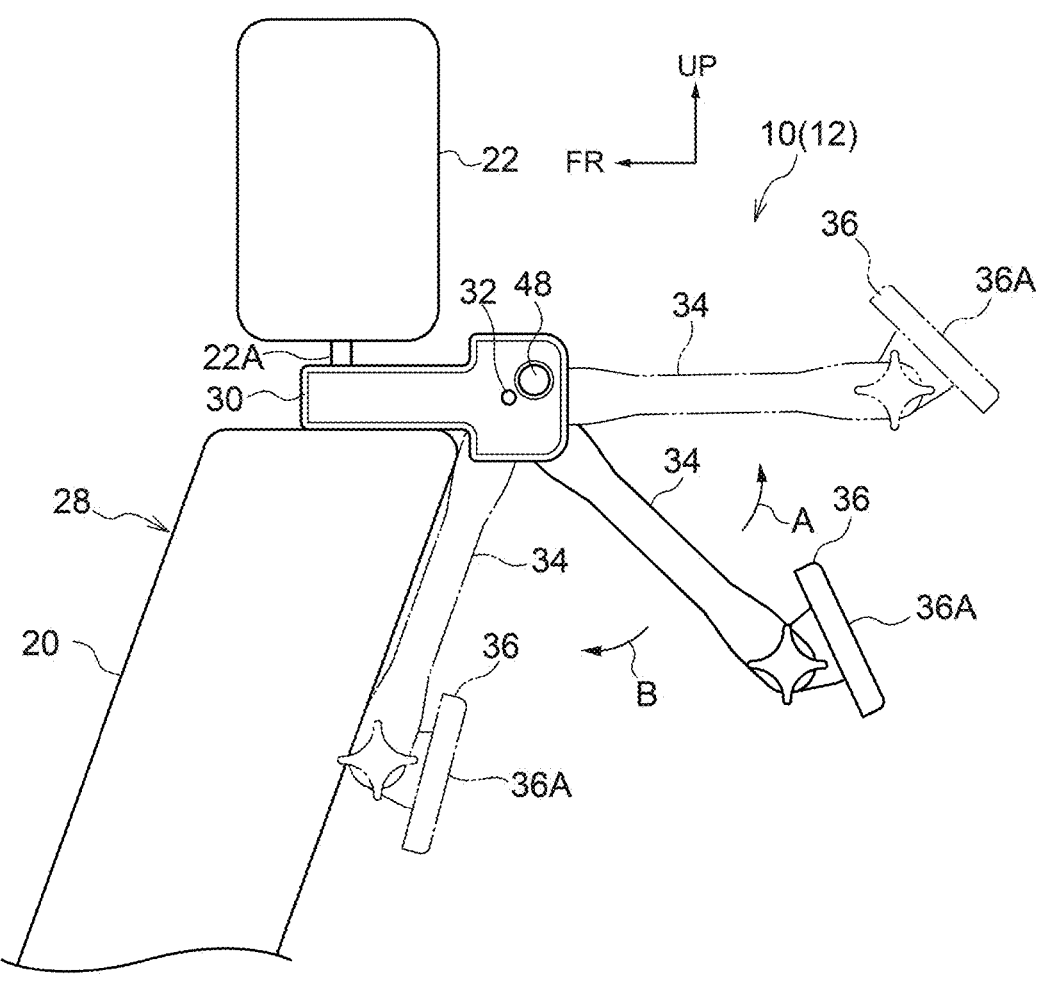
FIG. 3 is a side view, seen from the left, showing a hand rest device according to the exemplary embodiment of the present disclosure.

When the hand rest 36 is disposed at the first usage position or the second usage position, a turning position of the hand rest 36 relative to the turning shaft 34 is at a support position, and when the hand rest 36 is disposed at the storage position, the turning position of the hand rest 36 relative to the turning shaft 34 is at a stowed position (see FIG. 3). Relative to the stowed position of the support surface 36A of the hand rest 36, the support surface 36A at the support position is angled to the lower side and to the opposite side thereof from the side at which the turning shall 34 is disposed.

When the hand rest 36 is disposed at the first usage position, if the vehicle occupant 26 has a physique corresponding to JM50 (JIS D4607:1994, a three-dimensional seated dummy model for measuring dimensions in a vehicle cabin), a center of the support surface 36A of the hand rest 36 is disposed at a height 320 mm from the hip point HP (is disposed at the height of a lower end of the sternum of the vehicle occupant 26 (the lower end of the xiphoid process), which is a minimum appropriate height). When the hand rest 36 is disposed at the second usage position, if the vehicle occupant 26 has a physique corresponding to JM50, the center of the support surface 36A of the hand rest 36 is disposed at a height 500 mm from the hip point HP (is disposed at the height of the upper end of a shoulder of the vehicle occupant 26, which is a maximum appropriate height).

Now, operation of the present exemplary embodiment is described.

In the vehicle seat apparatus 14 with the structure described above, when the vehicle occupant 26 is seated at the seat 16 and the hand rest 36 is disposed at the first usage position or second usage position, the support surface 36A of the hand rest 36 supports the hand of the vehicle occupant 26.

In this structure, the height of a usage position of the hand rest 36 can be adjusted to the first usage position or the second usage position by the adjustment mechanism 38. Therefore, the height of the usage position of the hand rest 36 may be set appropriately.

When the hand rest 36 is disposed at the first usage position, if the vehicle occupant 26 has a physique corresponding to JM50, the center of the support surface 36A of the hand rest 36 is disposed at a height 320 mm from the hip point HP (is disposed at the height of the lower end of the sternum of the vehicle occupant 26 (the lower end of the xiphoid process)). Therefore, if the vehicle occupant 26 is a small adult, the support surface 36A of the hand rest 36 may support a hand of the vehicle occupant 26 holding a smartphone (not shown in the drawings), and the height of the center of a screen of the smartphone, which is assumed to be 80 mm above the center of the support surface 36A, may be at the height of the lower end of the sternum of the vehicle occupant 26 (the lower end of the xiphoid process).

When the hand rest 36 is disposed at the second usage position, if the vehicle occupant 26 has a physique corresponding to JM50, the center of the support surface 36A of the hand rest 36 is disposed at a height 500 mm from the hip point HP (is disposed at the height of the upper end of a shoulder of the vehicle occupant 26). Therefore, if the vehicle occupant 26 is a large adult, the support surface 36A of the hand rest 36 may support a hand of the vehicle occupant 26 holding a smartphone (not shown in the drawings), and the height of the center of the screen of the smartphone, which is assumed to be 80 mm above the center of the support surface 36A, may be at the height of the upper end of the shoulder of the vehicle occupant 26.

Thus, when the height of the center of the screen of the smartphone is at the height of the upper end of the shoulder of the vehicle occupant 26, a sightline of the vehicle occupant 26 to the screen of the smartphone may be substantially forward. Therefore, scenery outside the vehicle may be included in the field of view of the vehicle occupant 26. Thus, because information on movement of the vehicle relative to the ground is received, motion sickness of the vehicle occupant 26 may be suppressed. Furthermore, a need for the vehicle occupant 26 to bend their neck in order to see the screen of the smartphone may be reduced, and ease of viewing of the smartphone screen by the vehicle occupant 26 may be excellent, in addition to which fatigue in the neck of the vehicle occupant 26 may be moderated. Moreover, because the vehicle occupant 26 does not raise the hand holding the smartphone excessively, fatigue in the shoulder and arm of the vehicle occupant 26 may be moderated.

The arm rest 24 at the left side or right side of the seat 16 supports the arm (particularly the elbow) of the vehicle occupant 26 with the hand holding the smartphone. Therefore, fatigue in the shoulder and arm of the vehicle occupant 26 may be even further moderated.

The protruding plate 24A of the arm rest 24 protrudes to the left-right direction inner side of the seat 16 and supports the arm of the vehicle occupant 26. Therefore, even when the vehicle occupant 26 moves the hand holding the smartphone, to the middle side of the vehicle occupant 26 in the left-right direction, to make the smartphone screen easier to view, the protruding plate 24A may support the arm (particularly the elbow) of the vehicle occupant 26.

First Comparative Example

Figure 7B:
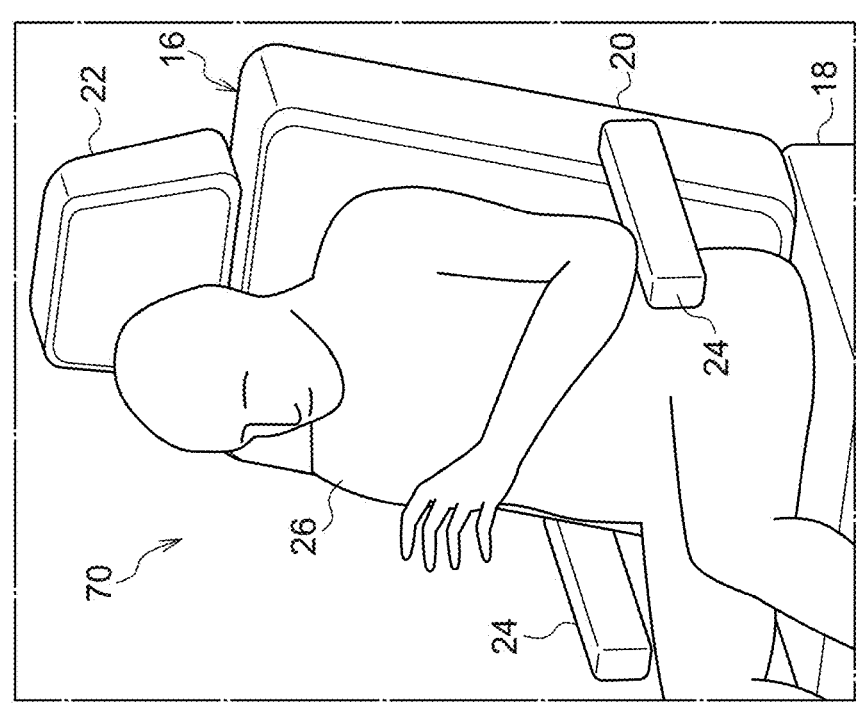
FIG. 7B is a perspective view, seen from the front-left, showing a vehicle seat apparatus according to a second comparative example.
Figure 7A:
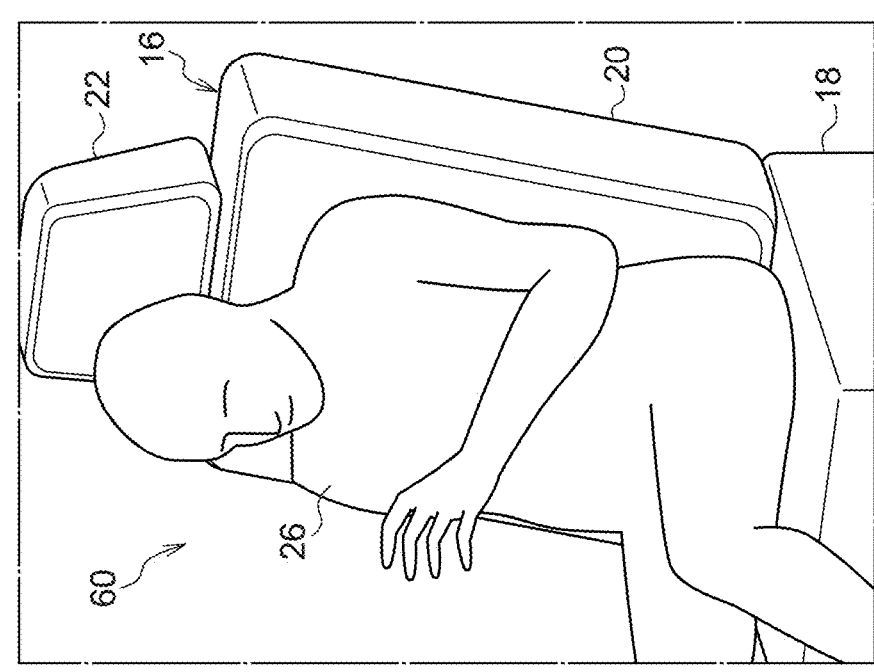
FIG. 7A is a perspective view, seen from the front-left, showing a vehicle seat apparatus according to a first comparative example.

FIG. 7A is a perspective view, seen from the front-left, showing a vehicle seat apparatus 60 according to a first comparative example.

As shown in FIG. 7A, the hand rest device 10 and the arm rests 24 according to the present exemplary embodiment are not provided at the vehicle seat apparatus 60 according to the first comparative example.

Second Comparative Example

FIG. 7B is a perspective view, seen from the front-left, showing a vehicle seat apparatus 70 according to a second comparative example.

As shown in FIG. 7B, the hand rest device 10 according to the present exemplary embodiment is not provided at the vehicle seat apparatus 70 according to the second comparative example, and the protruding plate 24A is not provided at each arm rest 24.

Example 1

Figure 8:
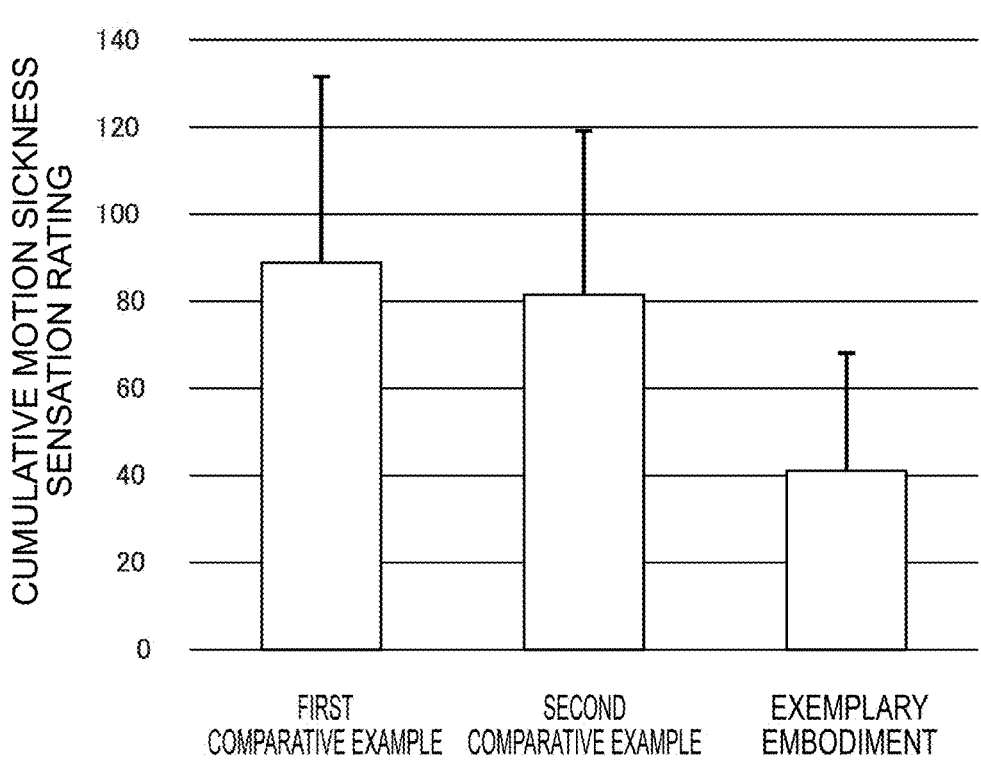
FIG. 8 is a graph depicting cumulative motion sickness sensation ratings for the vehicle seat apparatus according to the first comparative example, the vehicle seat apparatus according to the second comparative example and the vehicle seat apparatus in FIG. 2.

FIG. 8 is a graph depicting cumulative motion sickness sensation ratings for the vehicle seat apparatus 60 according to the first comparative example, the vehicle seat apparatus 70 according to the second comparative example and the vehicle seat apparatus 14 according to the present exemplary embodiment.

In Example 1, one-minute-interval evaluations of motion sickness sensation of the vehicle occupant 26 (see FIG. 13A) in a running vehicle were accumulated over 30 minutes to find a cumulative motion sickness sensation rating. FIG. 8 shows mean values of plural vehicle occupants 26. The error bars in FIG. 8 show standard deviations.

As shown in FIG. 8, the cumulative motion sickness sensation ratings were high with the first comparative example, high with the second comparative example (though a little lower than the first comparative example), and low with the present exemplary embodiment. Therefore, the present exemplary embodiment may suppress motion sickness of the vehicle occupant 26.

Example 2

Figure 9:
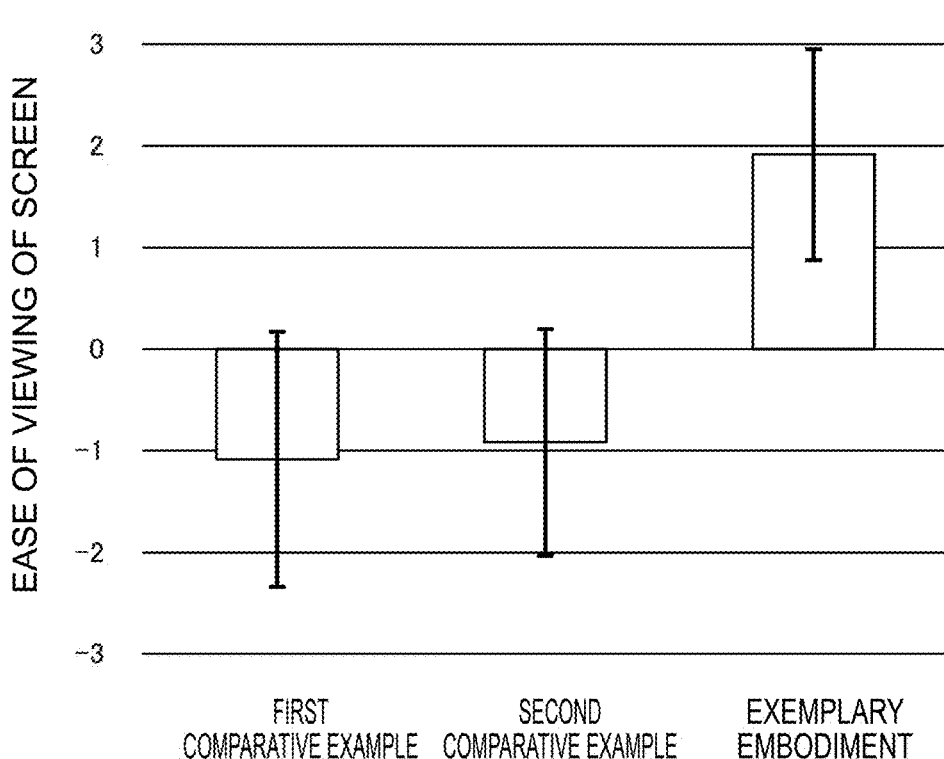
FIG. 9 is a graph depicting ease of viewing of a smartphone screen for the vehicle seat apparatus according to the first comparative example, the vehicle seat apparatus according to the second comparative example and the vehicle seat apparatus in FIG. 2.

FIG. 9 is a graph depicting ease of viewing of a smartphone screen for the vehicle seat apparatus 60 according to the first comparative example, the vehicle seat apparatus 70 according to the second comparative example and the vehicle seat apparatus 14 according to the present exemplary embodiment.

In Example 2, evaluations of ease of viewing of the smartphone screen by the vehicle occupant 26 (see FIG. 13B) were found. FIG. 9 shows mean values of plural vehicle occupants 26. The error bars in FIG. 9 show standard deviations.

As shown in FIG. 9, the evaluations were negative with the first comparative example, negative with the second comparative example (though a little less negative than the first comparative example), and positive with the present exemplary embodiment. Therefore, the present exemplary embodiment may make ease of viewing of a smartphone screen by the vehicle occupant 26 excellent.

Example 3

Figure 10:
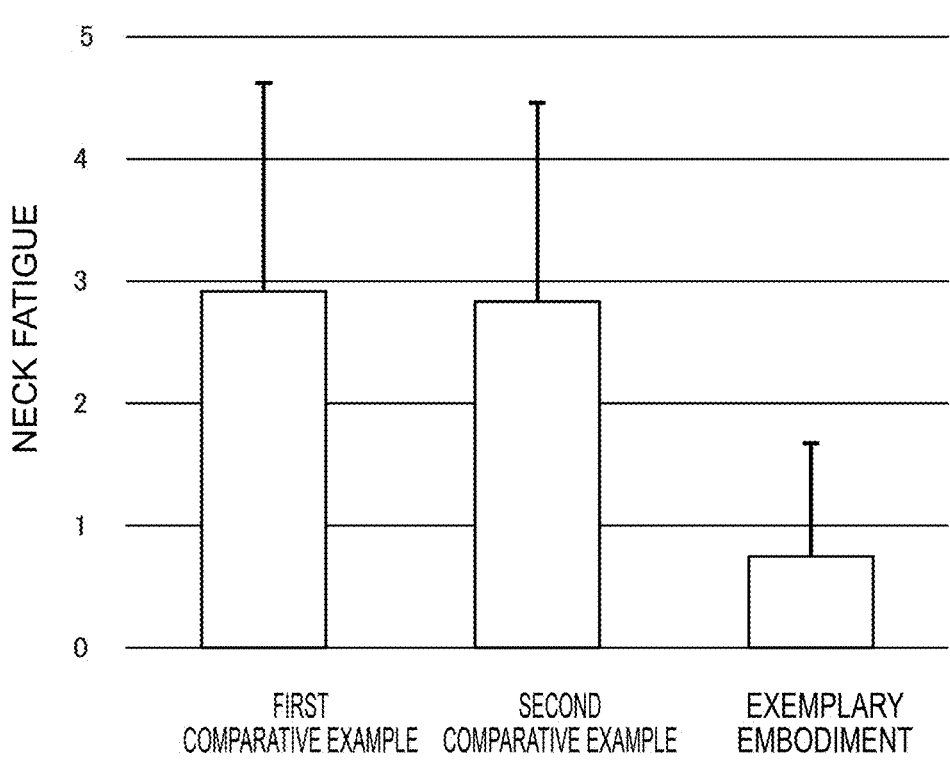
FIG. 10 is a graph depicting neck fatigue for the vehicle seat apparatus according to the first comparative example, the vehicle seat apparatus according to the second comparative example and the vehicle seat apparatus in FIG. 2.

FIG. 10 is a graph depicting neck fatigue for the vehicle seat apparatus 60 according to the first comparative example, the vehicle seat apparatus 70 according to the second comparative example and the vehicle seat apparatus 14 according to the present exemplary embodiment.

In Example 3, evaluations of neck fatigue of the vehicle occupant 26 (see FIG. 13C) were found. FIG. 10 shows mean values of plural vehicle occupants 26. The error bars in FIG. 10 show standard deviations.

As shown in FIG. 10, the evaluations were high with the first comparative example, high with the second comparative example (though a little lower than the first comparative example), and low with the present exemplary embodiment. Therefore, the present exemplary embodiment may moderate neck fatigue of the vehicle occupant 26.

Example 4

Figure 11:
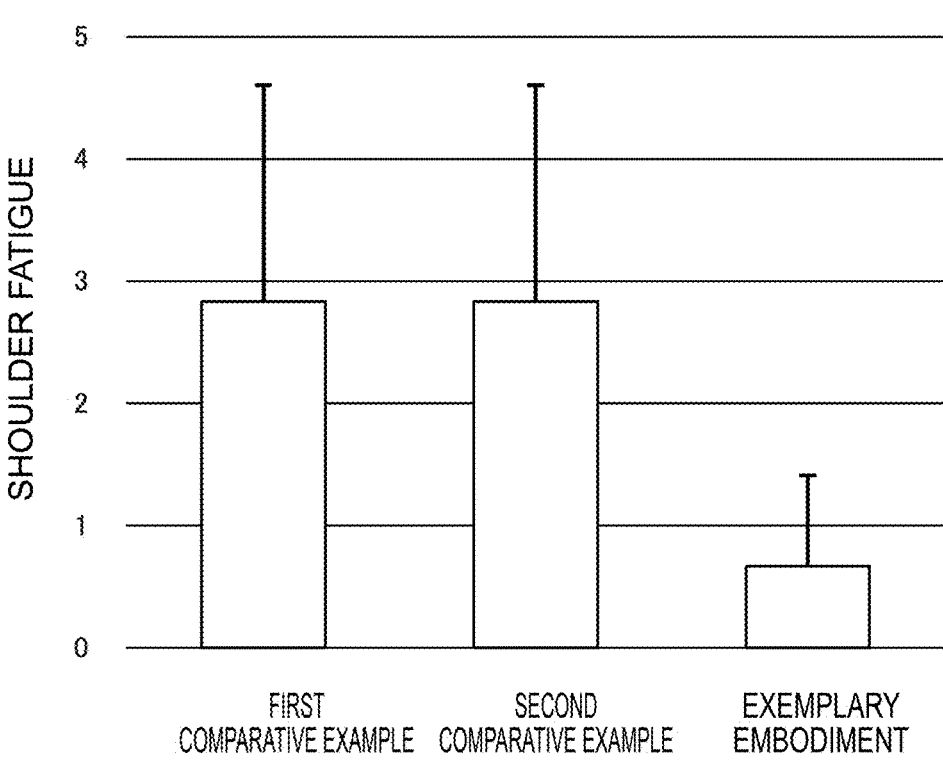
FIG. 11 is a graph depicting shoulder fatigue for the vehicle seat apparatus according to the first comparative example, the vehicle seat apparatus according to the second comparative example and the vehicle seat apparatus in FIG. 2.

FIG. 11 is a graph depicting shoulder fatigue for the vehicle seat apparatus 60 according to the first comparative example, the vehicle seat apparatus 70 according to the second comparative example and the vehicle seat apparatus 14 according to the present exemplary embodiment.

In Example 4, evaluations of shoulder fatigue of the vehicle occupant 26 (see 13C) were found. FIG. 11 shows mean values of plural vehicle occupants 26. The error bars in FIG. 11 show standard deviations.

As shown in FIG. 11, the evaluations were high with the first comparative example, high with the second comparative example (equal to the first comparative example), and low with the present exemplary embodiment. Therefore, the present exemplary embodiment may moderate shoulder fatigue of the vehicle occupant 26.

Example 5

Figure 12:
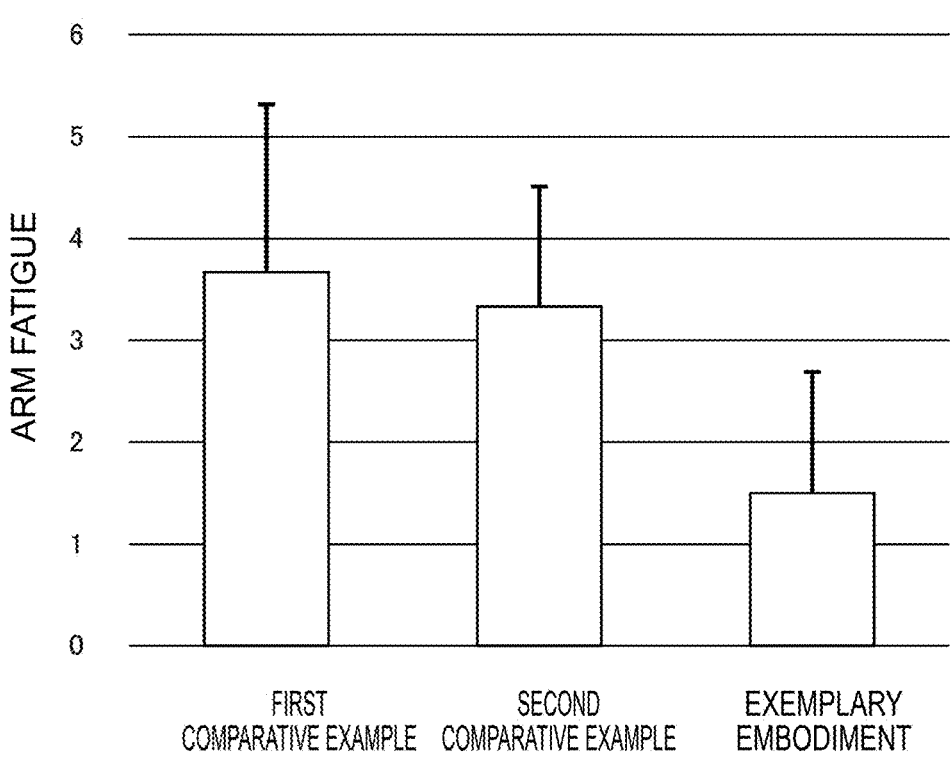
FIG. 12 is a graph depicting arm fatigue for the vehicle seat apparatus according to the first comparative example, the vehicle seat apparatus according to the second comparative example and the vehicle seat apparatus in FIG. 2.

FIG. 12 is a graph depicting arm fatigue for the vehicle seat apparatus 60 according to the first comparative example, the vehicle seat apparatus 70 according to the second comparative example and the vehicle seat apparatus 14 according to the present exemplary embodiment.

In Example 5, evaluations of arm fatigue of the vehicle occupant 26 (see FIG. 13C) were found. FIG. 12 shows mean values of plural vehicle occupants 26. The error bars in FIG. 12 show standard deviations.

As shown in FIG. 12, the evaluations were high with the first comparative example, high with the second comparative example (though a little lower than the first comparative example), and low with the present exemplary embodiment. Therefore, the present exemplary embodiment may moderate arm fatigue of the vehicle occupant 26.

Example 6

Figure 15:
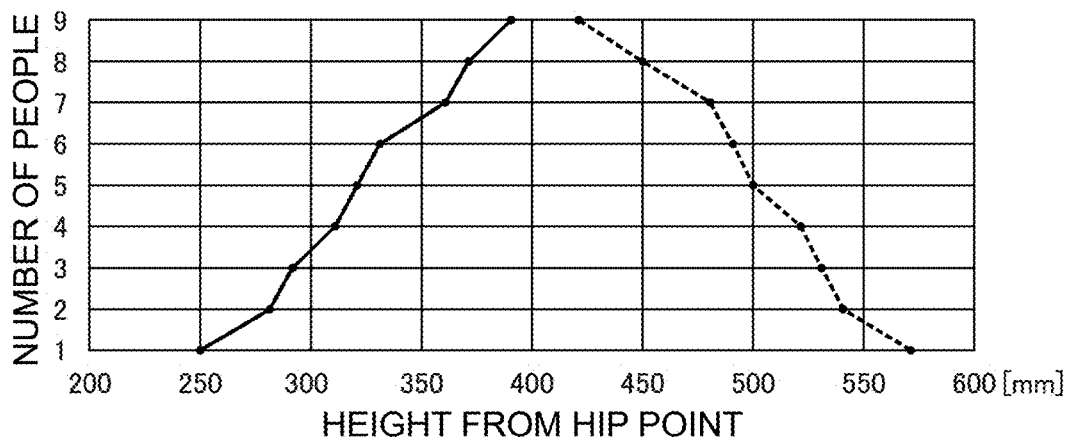
FIG. 15 is a graph depicting the numbers of people with heights of the hand rest according to the vehicle seat apparatus in FIG. 1 at which that many people can see forward in a field of view around their hand (the solid line) and heights of the hand rest at which that many people do not experience numbness in their arms (the broken line).

FIG. 14 is a table showing numbers of people with heights of the hand rest 36 of the vehicle seat apparatus 14 according to the present exemplary embodiment at which that many people can see forward in a field of view around their hand, and heights of the hand rest 36 at which that many people do not experience numbness in their arm. FIG. 15 is a graph depicting numbers of people with heights of the hand rest 36 of the vehicle seal apparatus 14 according to the present exemplary embodiment at which that many people can see forward in a field of view around their hand (the solid line), and heights of the hand rest at which that many people do not experience numbness in their arms (the broken line).

In Example 6, in the vehicle seat apparatus 14 according to the present exemplary embodiment, the height of the hand rest 36 (the center of the support surface 36A) supporting the hand of the vehicle occupant 26 was altered and numbers of the vehicle occupants 26 who could see forward in a field of view around their hand and numbers of the vehicle occupants 26 not experiencing numbness in their arms were found.

As shown in FIG. 14 and FIG. 15, as the height of the hand rest 36 from the hip point HP of the vehicle occupant 26 increased from 250 mm to 390 mm, the number of the vehicle occupants 26 who could see forward in the field of view around their hand increased. When the height of the hand rest 36 from the hip point HP of the vehicle occupant 26 was 320 mm or more, more than half of the vehicle occupants 26 could see forward in the field of view around their hands. The rate of increase in this number of the vehicle occupants 26 was large when the height of the hand rest 36 was at 280 mm, 310 min and 360 mm.

As the height of the hand rest 36 from the hip point HP of the vehicle occupant 26 decreased from 570 mm to 420 mm, the number of the vehicle occupants 26 not feeling numbness in their arm increased. When the height of the hand rest 36 from the hip point HP of the vehicle occupant 26 was 500 mm or less, more than half of the vehicle occupants 26 did not feel numbness in their arm. The rate of increase in this number of the vehicle occupants 26 was large when the height of the hand rest 36 was at 540 mm and 500 mm. A factor in the vehicle occupant 26 feeling numbness in their arm was at least part of the forearm of the vehicle occupant 26 being higher than the heart of the vehicle occupant 26.

In the present exemplary embodiment, the adjustment mechanism 38 adjusts the usage position of the hand rest 36 to heights at two levels. However, the adjustment mechanism 38 may be made to adjust the usage position of the hand rest 36 to heights at three or more levels.

In the present exemplary embodiment, the lowest usage position of the hand rest 36 (the first usage position) is at the minimum appropriate height of the hand rest 36 (the height of the center of the support surface 36A being 320 mm from the hip point HP of the vehicle occupant 26 whose physique corresponds to JM50). However, the lowest usage position of the hand rest 36 may be set higher than the minimum appropriate height of the hand rest 36.

In the present exemplary embodiment, the highest usage position of the hand rest 36 (the second usage position) is at the maximum appropriate height of the hand rest 36 (the height of the center of the support surface 36A being 500 mm from the hip point HP of the vehicle occupant 26 whose physique corresponds to JM50). However, the highest usage position of the hand rest 36 may be set lower than the maximum appropriate height of the hand rest 36.

In the present exemplary embodiment, the minimum appropriate height of the hand rest 36 is set to the height of the center of the support surface 36A being 320 mm from the hip point HP of the vehicle occupant 26 whose physique corresponds to JM50. However, the minimum appropriate height of the hand rest 36 may be set to the height of the center of the support surface 36A being 280 mm or 310 mm from the hip point HP of the vehicle occupant 26 whose physique corresponds to JM50, The present exemplary embodiment is described using a case in which the vehicle occupant 26 has a physique corresponding to JM50 as a reference. However, the present exemplary embodiment may be adapted to a wide range of physiques of the vehicle occupant 26, such as a case in which the vehicle occupant 26 has a physique corresponding to JF05, a case in which the vehicle occupant 26 has a physique corresponding to JM95, a case in which the vehicle occupant 26 has a physique corresponding to AM50 (Which is equivalent to JM95) and the like.

In the present exemplary embodiment, the two turning shafts 34 support the hand rest 36. However, one or three or more of the turning shafts 34 may support the hand rest 36.

In the present exemplary embodiment, the hand rest device 10 is attached to the head rest 22. However, the hand rest device 10 may be attached to the seat back 20.

What is claimed is:

1. A hand rest device, comprising:
a hand rest that is disposed at a front side of a seat of a vehicle, the hand rest being disposed at a usage position for supporting a hand of a vehicle occupant having a physique corresponding to JM50 seated at the seat, the hand rest being attached to the front seat via a pair of attachment bodies attached to stays of a headrest of the front seat, the hand rest being turnably supported by a turning shaft provided at a rear portion of the attachment bodies; and an adjustment mechanism provided between the attachment bodies and the turning shaft, and configured to adjust a height of the usage position of the hand rest to a height in a height range from greater than or equal to 320 mm to less than or equal to 500 mm from a hip point of the vehicle occupant, wherein the adjustment mechanism comprises:
a casing fixed to the turning shaft;
a central shaft provided inside the casing;
a gearwheel fixed to the central shaft;
a restraining protrusion integrally provided on the casing; and
a restraining slot formed at an outer peripheral portion of the gearwheel, wherein a turning direction of the casing and the turning shaft is restrained by the restraining protrusion abutting on one end surface or another end surface of the restraining slot.

2. The hand rest device according to claim 1, wherein the height range is from a lower end of a sternum to an upper end of a shoulder of the vehicle occupant.

3. A vehicle occupant support device, comprising:
the hand rest device according to claim 2; and
an arm rest disposed at a left side or a right side of the seat,
a protrusion portion being provided at the arm rest, and
the protrusion portion protruding to a left-right direction inner side of the seat to support an arm of the vehicle occupant.

4. A vehicle occupant support device, comprising:
the hand rest device according to claim 1; and
an arm rest disposed at a left side or a right side of the seat,
a protrusion portion being provided at the arm rest, and
the protrusion portion protruding to a left-right direction inner side of the seat to support an arm of the vehicle occupant.

* * * * *